No. 661,773. Patented Nov. 13, 1900.
W. E. SELL.
SNAP ATTACHMENT.
(Application filed Aug. 24, 1900.)

(No Model.)

Witnesses.
E. B. Gilchrist
F. D. Ammen

Inventor.
William E. Sell,
By his Attorneys,
Thurston & Bates

UNITED STATES PATENT OFFICE.

WILLIAM E. SELL, OF CANTON, OHIO, ASSIGNOR TO THE GILLIAM MANUFACTURING COMPANY, OF SAME PLACE.

SNAP ATTACHMENT.

SPECIFICATION forming part of Letters Patent No. 661,773, dated November 13, 1900.

Application filed August 24, 1900. Serial No. 27,876. (No model.)

*To all whom it may concern:*

Be it known that I, WILLIAM E. SELL, a citizen of the United States, residing at Canton, in the county of Stark and State of Ohio, have invented a certain new and useful Improvement in Snap Attachments, of which the following is a full, clear, and exact description, reference being had to the accompanying drawings.

My invention relates to snaps or snap-hooks used for removably connecting together coöperating parts in various places—as a harness, for example.

The object of the invention is to provide an attachment tending to prevent accidental opening of the snap and further providing an additional emergency connection should the snap become thus opened.

The invention is adapted for various uses. It may be employed with especial advantage, for example, in coupling a trotting-hopple with its supporting-strap. It is desirable when hopples are used to be able to remove them more easily and quickly than can be done when the supporting-strap is simply buckled, and snaps have been used for this purpose; but in such case the motion of the horse is liable to open the snap, causing the hopple to drop, and thus throwing and injuring the horse.

My invention consists of a snap-hook combined with a suitably-carried eye therefor and an emergency-strap taking onto the hook behind the eye, tending to prevent the snap-tongue from releasing the eye and furnishing an additional hold on the hook should such release be accidentally effected.

The invention is more specifically hereinafter described, and the combinations of parts set out in the claims also define wherein it consists.

Figure 1:
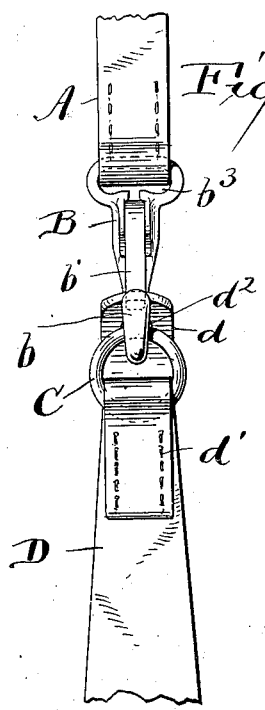
Figure 2:
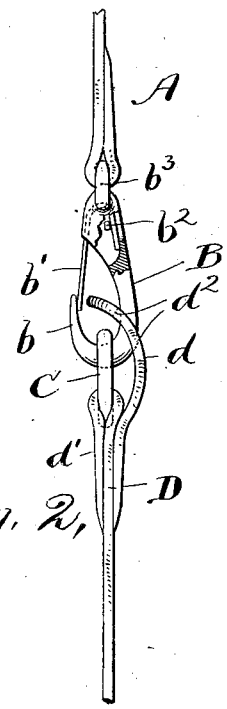
Figure 3:
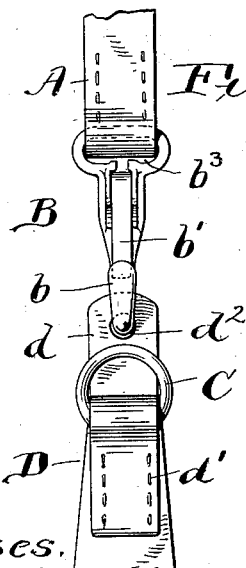
Figure 4:
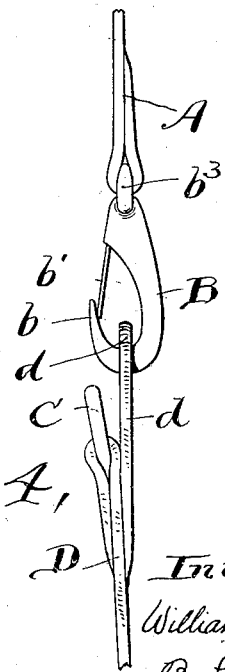

In the drawings, Figure 1 is a front elevation of a pair of coöperating straps with a snap and eye having my invention as in normal use. Fig. 2 is a side elevation thereof. Figs. 3 and 4 are corresponding views after the eye has become disengaged from the hook.

Referring to the parts by letters, A represents a suitable strap, which may be the lower end of the supporting-strap for a hopple.

B represents the snap carried by the strap. This snap consists of the hook $b$ and the tongue $b'$, spring-pressed against the inside of the point of the hook. As shown, this tongue is itself a spring, its own resilience furnishing the spring-pressure. This spring is clamped within the hook portion of the snap, occupying an opening therein and being held by lugs $b^2$ on one side of it and the back of the opening on the other. An integral eye $b^3$ is formed at the upper end of the hook portion, through which the strap A takes, as shown. The particular construction of the snap is not a portion of this invention.

D represents the coöperating strap, which may be simply a short tab extending upward from the hopple or of other form. The upper end of this strap passes through an eye C and is bent back on itself and sewed thereto at $d'$, securing the eye in place. On the rear side of this strap is a flexible tongue $d$, made, preferably, of material similar to the strap and sewed to it by the same stitches $d'$ which sew down the projecting end of the strap itself. This tongue $d$ extends above the eye C and has above it a hole $d^2$, which is adapted to take onto the hook of the snap. In normal use the hook of the snap passes first through the hole $d^2$ of the flexible tongue and then through the eye C, as shown in Figs. 1 and 2. In this position the extreme end of the flexible tongue coöperating with the tongue $b'$ of the snap tends to prevent that tongue being accidentally forced inward and releasing the eye. Inasmuch, however, as the eye must be easily releasable when desired, it is liable to become released accidentally; but in that event with my improvement the tongue $d$ remains hung by the hook, retaining the strap D, as shown in Figs. 3 and 4.

When the parts are in normal position and it is desired to release the eye, the flexible tongue is straightened up slightly along the inner side of the hook, thus allowing the spring-tongue $b'$ to be forced back from the hook, and then after the eye has been removed from the hook the flexible tongue itself is removed.

Having described my invention, I claim—

1. The combination of a snap having a hook and spring-pressed tongue, an eye adapted to take onto the hook, and a flexible strap taking onto the hook at the rear of the eye and tending to retard the opening of the snap, said eye and strap being connected with the same member whereby the strap furnishes an extra hold if the eye does pass off the snap, substantially as described.

2. In combination, a snap, a member carrying the same, a coöperating eye, and a member carrying it, a flexible tongue extending from the member which carries the eye and passing onto the hook of the snap, substantially as described.

3. The combination of a snap consisting of a hook, and a tongue spring-pressed against the inner side of the hook, a strap, an eye secured thereto, a flexible extension secured to said strap and extending beyond the eye and having an opening in it near its end which opening and eye are both adapted to pass onto the hook of the snap, the tongue being long enough to be relieved of the weight of the strap when the eye is on the hook, substantially as described.

4. The combination of a snap consisting of a hook, and a tongue spring-pressed against the inner side of the point of the hook, a strap, an eye through which the upper end of the strap extends said end being bent back upon the strap, a flexible tongue secured to said strap and extending above the eye and having an opening through it above the eye, said extension being adapted to hook onto the snap back of the eye, the same threads passing through the turned-over end of the strap through the strap itself and through the tongue, securing all three of these parts together, substantially as described.

In testimony whereof I hereunto affix my signature in the presence of two witnesses.

WILLIAM E. SELL.

Witnesses:
CHAS. C. BOW,
W. F. YOST.